Oct. 15, 1946.  J. W. JACOBS  2,409,434
DOMESTIC APPLIANCE
Filed Nov. 20, 1940  2 Sheets-Sheet 1

INVENTOR.
James W. Jacobs
BY
Spencer Hardman & John

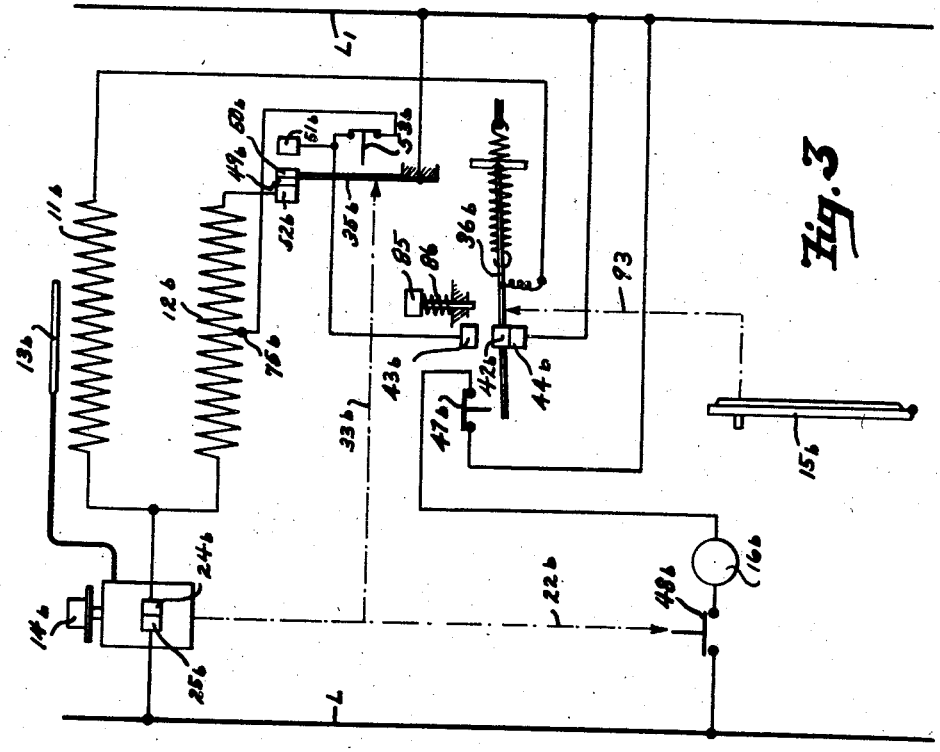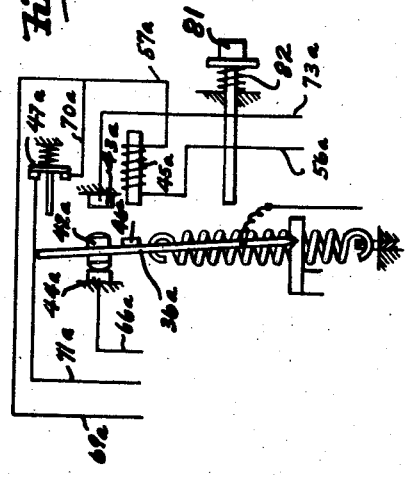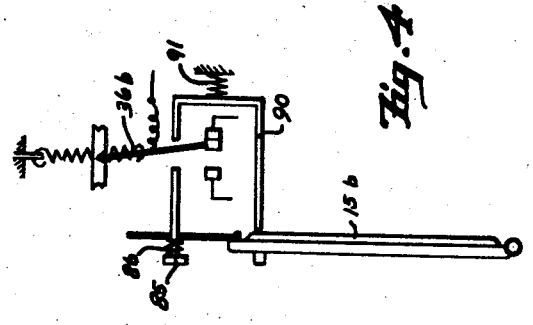

Patented Oct. 15, 1946

2,409,434

UNITED STATES PATENT OFFICE 2,409,434

DOMESTIC APPLIANCE

James W. Jacobs, Dayton, Ohio, assignor to General Motors Corporation, Dayton, Ohio, a corporation of Delaware Application November 20, 1940, Serial No. 366,444

8 Claims. (Cl. 219—20)

This invention relates to domestic appliances and more particularly to electric ranges.

An object of this invention is to provide an oven circuit and controls therefor such that the oven heating means may be initially set for rapid preheating to be terminated by the opening of the door when foods are placed in the oven, so that after the foods have been placed in the oven, the oven may be heated at the normal baking rate.

Further objects and advantages of the present invention may be apparent from the following description, reference being had to the accompanying drawings, wherein a preferred form of the present invention is clearly shown.

In the drawings:

Fig. 2 is a diagrammatic representation of a portion of the circuit shown in Fig. 1, with a push button setting for the preheat circuit;

Fig. 3 is a diagrammatic representation of an oven heating circuit in which the preheat termination is performed by mechanical means connected to the door;

Fig. 4 is a diagrammatic representation of the mechanical means indicated in Fig. 3.

Figures 1, 5:
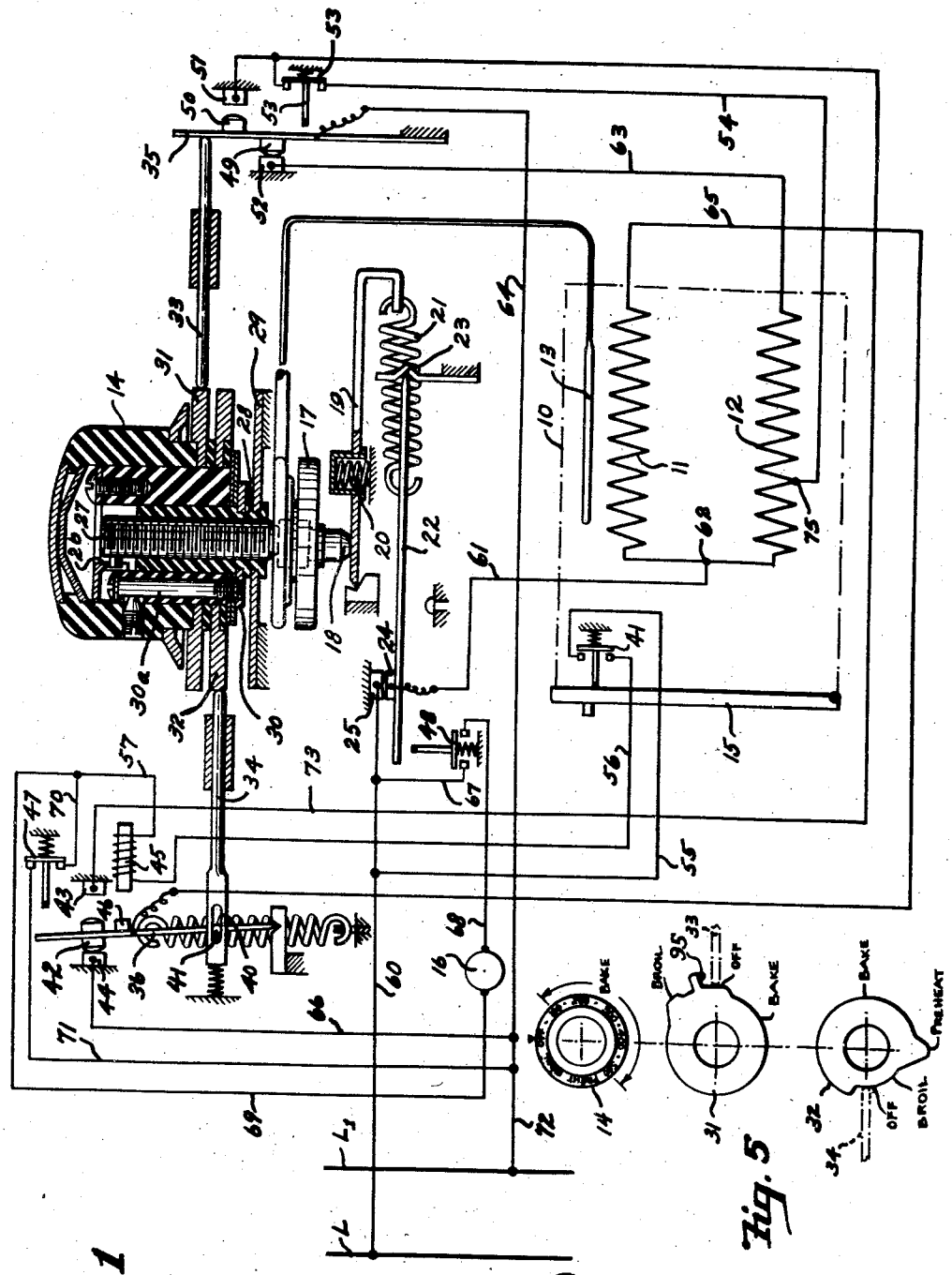
Fig. 1 is a diagrammatic representation of the controls and circuits for heating the oven.
Fig. 5 is a diagrammatic representation of the control knob and cams shown in Figs. 1 and 3.

An oven 10 may be provided with an upper resistance 11 which primarily may be used for broiling purposes, and a lower resistance 12 which primarily may be used for baking purposes. These resistances may be energized at substantially their maximum wattage for rapid preheating of the oven. Thereafter the baking resistance 12 may be operated at a relatively high wattage with or without the resistance 11 at a reduced wattage for baking purposes. A thermostat 13 may be made responsive to oven temperatures. An adjusting handle 14 may be provided for adjusting the temperature to which the thermostat is responsive. The oven is provided with a door 15. The arrangement is such that by proper manipulation of the handle 14, the resistances 11 and 12 are primarily energized at their maximum wattage until the temperature is reached to which the thermostat 13 has been made responsive. At this time a light or buzzer 16 is energized to notify the user that the oven has been properly preheated. The resistances are deenergized at this time also in order to prevent overheating of the oven. When the user opens the door 15 to insert food into the oven, the circuit arrangement is altered, so that thereafter the heaters, or either one of the heaters, are cycled at reduced wattage under the control of thermostat 13.

In order to accomplish the foregoing, a multiple line source of power L—L₁ may be provided. The thermostat 13 is connected to a bellows or diaphragm 17, the point 18 of which engages and rocks the lever 19. The lever 19 is urged against the point 18 by the spring 20. The lever 19 carries one end of the snap spring 21, the other end being connected to a lever 22 fulcrumed at 23. The lever 22 carries movable contact 24 engaging stationary contact 25.

To provide temperature adjustment, the handle 14 is a rotatable knob keyed at 26 to the screw 27, which has threaded engagement in the stationary sleeve 28 carried by the frame 29 of the range. The knob 14 is prevented from moving axially by the washer 30 held in a groove of the sleeve 28 and secured to the knob by bolts 30a. Rotation of the knob 14 causes axial movement of the screw 27 thereby changing or adjusting the temperature to which the thermostat 13 is responsive, as will be apparent to those skilled in the art.

The knob 14 is provided with cams 31 and 32 adapted to set contacts for controlling the circuit to "off," "bake," "broil" and "preheat" positions. The cams 31 and 32 operate rods 33 and 34 respectively. Cam 31 and rod 33 move the lever 35 outwardly to the right against its normal inward or brake position to an intermediate position on the "off" position of the handle 14. The cam 31 also moves the lever 35 to its outermost position in the "broil" circuit. Cam 32 and rod 34 move the snap lever 36 of the door-operated switch outwardly to the left on the "preheat" position. When the knob 14 is on "bake," the cam 32 and rod 34 are in an intermediate position, but because of the slot 40 in the rod 34, the lever 36 may be either in the left hand or right hand position at this time. When the knob 14 is on the "off" and "broil" positions, rod 34 is moved to the extreme right and thus forces the lever 36 to the right or normal position through the action of slot 40 on pin 41'.

The door 15 controls switch 41, maintaining it in open position when the door is closed and closing the switch when the door is opened. The lever 36 is provided with a double movable contact 42 engaging the stationary contacts 43 and 44. A solenoid 45 is provided acting on the armature 46 to draw the lever 36 to the right when the solenoid is energized. A switch 41 is provided which is opened whenever the lever 36 is to the right. The lever 22 closes the switch 48 whenever the thermostat 13 has reached its temperature setting. The lever 35 carries movable contacts 49 and 50 engaging stationary contacts 51 and 52. The lever 35 also opens the switch 53 when the lever 35 is in its right hand position.

With the foregoing preliminary description the operation of the circuit will now be described:

"Preheat," Fig. 1

To "preheat" the oven, knob 14 is turned to the "preheat" position and then to any desired "bake" temperature setting from 100 to 500. This manipulation forces levers 36 and 35 to the left. As the thermostat 13 is cold, the lever 22 is in its upper position and the switch 48 is open, switch 41 is open. Switch 47 is closed. Switch 53 is closed. Under these circumstances resistances 11 and 12 are in parallel across the lines $L_1$—$L_2$ and are thus energized substantially at their maximum wattage to preheat the oven quickly. The circuits may be traced from L through 60, 25, 24, 61, branching at 62, one branch going through resistance 12, 63, 52, 49, 64, 72 to $L_1$. The other branch from 62 goes through resistance 11, 65, 42, 44, 66, 72 to $L_1$.

"Preheat" termination, Fig. 1

When the thermostat 13 is heated to the selected temperature by the heaters 11 and 12 in parallel, the lever 22 is moved to its lower position. This breaks the circuit through the heaters 11 and 12 to prevent overheating of the oven, and energizes the signal 16 to notify the user that the oven is ready for baking operations. This is accomplished because the contacts 25 and 24 are opened and the switch 48 is closed. A circuit is established through the signal 16 from the line L through 60, 67, 48, 68, 16, 69, 70, 47, 71, 72 and $L_1$. The user, seeing or hearing the signal 16, opens the door 15 to insert food into the oven, and the opening of the door 15 automatically changes the circuits, so that thereafter the heaters 11 and 12 are cycled by the thermostat 13 under "bake" conditions. The food is therefore cooked in the oven under normal "bake" conditions. The circuits are changed by the opening of door 15, when the switch 41 is closed, causing energization of solenoid 45 and consequent movement of lever 36 to the right, closing contacts 42 and 43, and opening switch 47. Opening of switch 47 prevents further energization of "preheat" signal 16. Energization of solenoid 45 by the closing of switch 41 may be traced from L through 60, 55, 41, 56, 45, 57, 70, 47, 71, 72 and $L_1$.

"Bake," Fig. 1

The "bake" circuit produced by the "preheat" termination, energizes the heater 12 substantially at maximum wattage, and the heater 11 at reduced wattage. The various contacts and switches on the "bake" position, after the "preheat" has been terminated, is such that contacts 49 and 52 are closed, contacts 42 and 43 are closed, switch 47 is opened. Switch 41 is reopened by the closure of the door 15 after the food has been placed in the oven. Lever 22 cycles the switch 48 and the contacts 24 and 25 in response to oven temperature. However, the signal 16 is not further energized because switch 47 is open, but the heaters 11 and 12 are cycled by the cycling of contacts 24 and 25. When the oven is below the selected temperature, the heaters 11 and 12 are energized. The heater 12 is placed across the line $L_1$ and $L_2$ as previously described with regard to "preheat." The upper heater 11 is energized at reduced voltage, the circuit branching at 62 from L going through heater 11, 65, 42, 43, 73, 53, 54 to a point 75 tapped into the heater 12 at a point where the voltage imposed on the heater 11 is less than that across $L_1$ and $L_2$. The heater 11 is therefore operated at reduced wattage. Under these conditions food placed between the heaters 11 and 12 is subject to a relatively large amount of heat from the bottom and a mild browning heat from the top.

"Broil," Fig. 1

When the knob 14 is moved to "broil," contacts 50 and 51 are closed as well as contacts 42 and 43. Switches 47 and 53 are opened through the operation of rods 33 and 34 respectively. Thermostat 13 being cold, contacts 24 and 25 are closed. This causes heater 11 to be placed across the lines $L_1$ and $L_2$, producing substantially maximum wattage of heater 11. Heater 12 is disconnected from the circuit. The circuit through the heater 11 can be traced from L through 60, 25, 24, 61, 11, 65, 42, 43, 73, 51, 50, 35, 64, 72 and $L_1$. The "broil" circuit may be operated with the door 15 either open or closed, as opening and closing of door switch 41 is immaterial when lever 36 is to the right, keeping the door switch circuit open at switch 47.

Figure 2

Fig. 2 is intended to show the same circuits as those shown in Fig. 1 with the exception that the "preheat" is accomplished by a push button 81, which is pushed to the left against the spring 82 and moves the lever 36a to the left for "preheat" operation. The push button 81 is used in lieu of rod 34 and knob 14 of Fig. 1 for the "preheat" setting, and the remainder of the circuit is exactly the same as in Fig. 1. The operation of this modified circuit is obvious from the preceding description of Fig. 1 and its operation. Parts shown in Fig. 2, which correspond to Fig. 1, are designated by the same numerals with the suffix "a" added, so that the location of the structure of Fig. 2 may be properly located with respect to Fig. 1.

Figures 3 and 4

Figs. 3 and 4 disclose a circuit similar to that disclosed in Fig. 1, but in which the change from "preheat" to "bake" is accomplished by a mechanical connection between the door 15b and the lever 36b in lieu of the electromagnetic connection of Fig. 1. This mechanical connection is such that the lever 36b is moved to the upper position in Fig. 3 (or left in Fig. 4) for "bake" when the door is open, and is moved to the lower position in Fig. 3 (or right in Fig. 4) for "preheat" by the push button 85 moved manually against a spring 86. The knob 14b actuates cams and mechanisms somewhat similar to those shown in Figs. 1 and 5, to adjust a thermostat 13b, which cycles the contacts 24b and 25b. The thermostat also cycles the switch 48b, while the knob 14b moves the lever 35b and its contacts 49b, 50b between the stationary contacts 51b and 52b. No cam corresponding to cam 32 of Fig. 1 need be used, although it may be used. A light or buzzer 16b is provided. The lever 36b carries contact 42b engaging stationary contacts 43b and 44b and opening and closing switch 47b. The operation and function of the various contacts and switches is substantially the same as those which bear corresponding numbers in Fig. 1 with the letter "b" eliminated.

The mechanical connection between the door 15b and the lever 36b may be accomplished by providing a movable member or slide 90 urged to the left by spring 91. When the door is opened the member 90 moves to the left (Fig. 4), engaging lever 36b and moving it to the left. The lever 36 is set by the push button 85 against the action of spring 86. The slide 90 and spring 91 are diagrammatically indicated in Fig. 3 by the dotted line 93. The energization of the heaters 11b and 12b is the same as in Fig. 1 under corresponding conditions.

In Figs. 3 and 4, when knob 14b is moved to a "bake" position and push buttons 85 are actuated, the following switches are closed: 42b, 44b, 47b, 49b—52b, 53b. Also contacts 24b and 25b and switch 48b are cycled. The remaining contacts or switches are open. This causes heaters 11b and 12b to be placed across the lines L—L₁ in parallel, and when the selected oven temperature is reached the signal 16b is energized.

Opening and reclosing of door 15b moves lever 36b to close contacts 42b, 43b and to open switch 47b, the remaining switches and contacts remaining as for "preheat." This causes the circuit to change to "bake," causing heater 12b to be across the lines L—L₁ with heater 11 connected between L and point 75b. The heaters 11b and 12b are cycled by thermostat 13b through the action of contacts 24b—25b.

Turning knob 14b to "broil" closes contact 50 on 51 and contact 42 on 43, opening switches 47 and 53. This places heater 11b across lines L—L₁ and disconnects heater 12b. Thermostat 13b can cycle heater 11b if the temperature in the oven should reach a temperature corresponding to the "broil" setting.

A stop 95 is provided for the knobs 14 and 14b between "off" and "broil."

While the form of embodiment of the invention as herein disclosed, constitutes a preferred form, it is to be understood that other forms might be adopted, all coming within the scope of the claims which follow.

What is claimed is as follows:

1. In combination an oven, an oven door, an upper electrical resistance in said oven, a lower electrical resistance in said oven, a source of electrical power, a door switch, having preheat and normal positions, a selector switch having a bake position and a broil position, connections between said source of power, electrical resistances, door switch in said preheat position, and said selector switch in said bake position to energize both said electrical resistances at relatively high wattage, connections between said source of power, electrical resistances, door switch in said normal position, and said selector switch in said bake position to energize said lower electrical resistance at relatively high wattage and to disconnect the circuit which energizes said upper electrical resistance at said relatively high wattage, connections between said source of power, electrical resistances, door switch in said normal position and said selector switch in said broil position to energize said upper electrical resistance at relatively high wattage and to disconnect the circuit which energizes said lower electrical resistance at relatively high wattage, manual means for moving said door switch to said preheat position, manual means for moving said selector switch to said bake and said broil positions, and means actuated by the movement of said oven door for moving said door switch to said normal position and maintaining said door switch in said normal position until reset by said first named manual means.

2. In combination an oven, an oven door, an upper electrical resistance in said oven, a lower electrical resistance in said oven, a source of electrical power, a snap switch, having preheat and normal positions, a selector switch having a bake position and a broil position, connections between said source of power, electrical resistances, snap switch in said preheat position, and said selector switch in said bake position to energize both said electrical resistances at relatively high wattage, connections between said source of power, electrical resistances, snap switch in said normal position, and said selector switch in said bake position to energize said lower electrical resistance at relatively high wattage and to disconnect the circuit which energizes said upper electrical resistance at said relatively high wattage, connections between said source of power, electrical resistances, snap switch and said selector switch in said broil position to energize said upper electrical resistance at relatively high wattage and to disconnect the circuit which energizes said lower electrical resistance at relatively high wattage, manual means for moving said snap switch to said preheat position, manual means for moving said selector switch to said bake and said broil positions, and means actuated by the movement of said oven door for moving said snap switch to said normal position and maintaining said snap switch in said normal position until reset by said first named manual means.

3. In combination, an oven, an oven door, an upper electrical resistance in said oven, a lower electrical resistance in said oven, said resistances having first and second terminals respectively, a first live line, a second live line, a reduced potential point of connection having a potential intermediate said live lines, connections between said first live line and said first terminals of said electrical resistances, a door switch having normal and preheat positions, a selector switch having bake and broil positions, connections between said second live line said second terminals of said resistances, said door switch in said preheat position and said selector switch in said bake position to energize both said electrical resistance at relatively high wattage, connections between said second live line, reduced potential point, said second terminals of said electrical resistances, door switch in said normal position, and said selector switch in said bake position to energize said lower electrical resistance at relatively high wattage and said upper electrical resistance at relatively low wattage, connections between said second live line, reduced potential point, said second terminals of said electrical resistances, door switch in said normal position and said selector switch in said broil position to energize said upper electrical resistance at relatively high wattage and to disconnect the circuit which energizes said lower electrical resistance at relatively high wattage, manual means for moving said door switch to said preheat position, manual means for moving said selector switch to said bake and said broil positions, and means actuated by the movement of said oven door for moving said door switch to said normal position and maintaining said door switch in said normal position until reset by said first named manual means.

4. In combination, an oven, an oven door, an upper electrical resistance in said oven, a lower electrical resistance in said oven, said resistances having first and second terminals respectively, a first live line, a second live line, a reduced potential point of connection having a potential intermediate said live lines, connections between said first live line and said first terminals of said electrical resistance, a door switch having normal and preheat positions, a selector switch having bake and broil positions, connections between said second live line said second terminals of said resistances, said door switch in said preheat position and said selector switch in said bake position to energize both said electrical resistances at relatively high wattage, connections between said second live line, reduced potential point, said second terminals of said electrical resistances, door switch in said normal position, and said selector switch in said bake position to energize said lower electrical resistance at relatively high wattage and said upper electrical resistance at relatively low wattage, connections between said second live line, reduced potential point, said second terminals of said electrical resistances, door switch in said normal position, and said selector switch in said broil position to energize said upper electrical resistance at relatively high wattage and to disconnect the circuit which energizes said lower electrical resistance at relatively high wattage, manual means for moving said door switch to said preheat position, manual means for moving said selector switch to said bake and broil positions, means actuated by the movement of said oven door for moving said door switch to said normal position and maintaining said door switch in said normal position until reset by said first named manual means, and a thermostat responsive to temperatures in said oven opening and closing one of said connections.

5. In combination, an oven, an oven door, an upper electrical resistance in said oven, a lower electrical resistance in said oven, said resistances having first and second terminals respectively, a first live line, a second live line, a reduced potential point of connection having a potential intermediate said live lines, connections between said first live line and said first terminals of said electrical resistances, a door switch having normal and preheat positions, a selector switch having bake and broil positions, connections between said second live line said second terminals of said resistances, said door switch in said preheat position and said selector switch in said bake position to energize both said electrical resistances at relatively high wattage, connections between said second live line, reduced potential point, said second terminals of said electrical resistances door switch in said normal position, and said selector switch in said bake position to energize said lower electrical resistance at relatively high wattage and said upper electrical resistance at relatively low wattage, connections between said second live line, reduced potential point, said second terminals of said electrical resistances, door switch in said normal position and said selector switch in said broil position to energize said upper electrical resistance at relatively high wattage and to disconnect the circuit which energizes said lower electrical resistance at relatively high wattage, manual means for moving said door switch to said preheat position, manual means for moving said selector switch to said bake and said broil positions, means actuated by the movement of said oven door for moving said door switch to said normal position and maintaining said door switch in said normal position until reset by said first named manual means, a thermostat responsive to temperatures in said oven opening and closing one of said connections.

6. In combination, an oven, an oven door electrical heating means in said oven, a source of electrical power, a snap switch having first and second positions, connections between said source of power and electrical heating means controlled differently by said snap switch in said two positions, a spring actuator released by said door in open position and retracted by said door in closed position, manual means, independent of said actuator, for moving said snap switch from said first to said second position when said door is closed and said spring actuator is retracted, said actuator moving said snap switch from said second position to said first position when said door is opened and said actuator is released.

7. In combination, an oven, an oven door, electrical heating means in said oven, a source of electrical power, a snap switch having first and second positions, connections between said source of power and electrical heating means controlled differently by said snap switch in said two positions, an actuator moved by said door in a first direction while said door is being opened and moved by said door in a second direction while said door is being closed, manual means independent of said actuator, for moving said snap switch from said first to said second position while said door is closed, said actuator moving said snap switch from said second position to said first position when said door is moved.

8. In combination, an oven, an oven door, electrical heating means for said oven energizable at relatively high wattage for preheating purposes and at relatively low wattage for baking purposes, a source of electrical power, a snap switch snapping to first and second positions, connections between said source of power and electrical heating means controlled in said first position to energize said heating means at relatively low wattage for baking purposes and controlled in said second position to energize said heating means at relatively high wattage for preheating purposes, an actuator cooperating with said door to be moved while said door is being opened and closed, manual means independent of said actuator for snapping said snap switch from said first to said second position while said door is closed to energize said heating means for preheating purposes, said actuator moving said snap switch from said second position to said first position when said door is moved to energize said heating means for baking purposes, said snap switch remaining in said first position until reset by said manual means.

JAMES W. JACOBS.